(12) United States Patent
Ali et al.

(10) Patent No.: US 6,198,181 B1
(45) Date of Patent: Mar. 6, 2001

(54) MOTOR DESIGN METHODS AND MOTORS FABRICATED THEREFROM

(75) Inventors: Mohamed Ahmed Ali; Mohamed E. Osama, both of Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/442,322

(22) Filed: Nov. 22, 1999

(51) Int. Cl.[7] ................................................... H02K 15/00
(52) U.S. Cl. ............................ 310/42; 310/261; 310/273; 310/211; 29/596; 703/1; 703/2
(58) Field of Search ............................... 310/261, 42, 273, 310/211; 364/488; 29/596; 703/1, 2, 13

(56) References Cited

PUBLICATIONS

Ojo, "Multiobjective Optimum Design..."IEEE IAS Conference, 1991 vol. 1., pp. 163–168.*

Madescu et al. "The Optimal Lamination Approach (OLA) to Induction Machine Design Global Optimization," IEEE 31st IAS Annual Meeting, Conference Record vol. 1, pp. 574–580.*

Yoon et al. "Robust Shape Optimiization of Electromechanical Devices," IEEE Transactions on Magnetics vol. 35, No. 3 May 5, 1999.*

S. Williamson, et al "Optimization of the Geometry of Closed Rotor Slots or Cage Induction Motors", IEEE Trans. on Industry Applications, vol. 32, No. 3, May/Jun. 1996, pp. 560–568.

J. Moses, et al "A Computer–Based Design Assistant for Induction Motors", IEEE Trans. on Industry Applications, vol. 30, No. 6. Nov./Dec./ 1992, pp. 1616–1624.

O. Gol., et al "Optimal Induction Motor Design by the use of NLP–Approximation Approach and SQP–Method", Electric Machines and Power Systems, 27:601–512, 1999.

C. Tucci, et al "A Simulator of the Manufacturing of Induction Motors", IEEE Trans. On Industry Applications, vol. 30, No. 3, May/Jun. 1994, pp. 578–584/.

S. Williamson et al. "The Application of Minimisation Algorithms in Electrical Engineering"IEE Proc.ptA, vol. 127 No. 8, pp. 528–530.*

B. Singh et al. "Experience in Design Optimization of Induction Motor using 'SUMT ' Algorithm" IEEE Transactions on Power Apparatus and Systems, vol.PAS–102, No. 10, pp. 3379–3384.*

Applebaum et al. "Optimization of Three–Phase Induction Motor Design" IEEE Transactions on Energy Conversion, vol.EC–2, No. 3, pp. 407–422, Sep. 1987.*

* cited by examiner

*Primary Examiner*—Burton Mullins

(57) ABSTRACT

A motor which has optimal performance along with minimal performance sensitivity with respect to manufacturing variations is described. Performance is defined by a critical-to-quality relationship. A process for designing such a robustly optimal, yet manufacturable, motor also is described.

10 Claims, 2 Drawing Sheets

MOTOR DESIGN METHODS AND MOTORS FABRICATED THEREFROM

BACKGROUND

This invention relates generally to dynamo-electric machines and, more particularly, to processes for designing rotors of such machines.

A dynamoelectric machine, such as an AC induction motor, typically includes a rotor core which, in one known form, has opposed substantially planar end surfaces and a substantially cylindrical, longitudinally extending body portion. The rotor core also has a rotor shaft bore and a plurality of rotor bar slots. The rotor bar slots sometimes are referred to as secondary conductor slots.

The above described rotor core typically is formed by a plurality of steel laminations. More specifically, each lamination is stamped from a steel sheet, and has a central opening and a plurality of spaced, radially arranged openings adjacent the lamination outer periphery. The laminations are arranged in a stack so that the openings at the outer periphery of the laminations are aligned to form rotor bar slots and the central openings are aligned to form the rotor shaft bore. The rotor core can alternatively be formed of solid magnetic steel.

To complete the rotor formation process for a standard cast aluminum type rotor, rotor bars are cast in the rotor bar slots and end rings are cast at the opposing ends of the core using, for example, an aluminum casting process. The rotor bars typically extend through the slots and the end rings "short" the bars together at the ends of the rotor core. A rotor shaft extends into the rotor shaft bore and is secured to the rotor core by any suitable process, such as, for example, interference fit or keying. Such a rotor sometimes is referred to in the art as a "squirrel cage" type rotor.

In an X-ray tube, electrons are produced at a cathode by heating a filament. The electrons are attracted to an anode target by a high voltage potential difference (typically about forty to one hundred fifty kilovolts). When the accelerated electrons hit the anode target, X-rays are produced. Only about one percent of the electron energy is converted into X-ray radiation. The remaining energy is converted into heat. To avoid exceeding the melting point of the focal spot on the target where electrons hit, the target is rotated. An induction motor with a squirrel cage rotor can be utilized for rotating the X-ray tube anode. In X-ray tube motors, the rotor bars are usually made of copper due to high operating temperature of the rotor (250–450 ° C.) where aluminum resistivity would be too high. These copper bars are either cast (in a similar way to aluminum bars) or pre-fabricated.

In operation, an induction motor, including a squirrel cage type rotor, rotates at a target speed. A supply source impresses an alternating voltage on stator windings to create an alternating current in the stator windings. The alternating current generates an alternating magnetic field which induces currents in the rotor bars of the rotor. Current flow through the rotor bars results in the generation of magnetic fields. As is well known, the magnetic fields generated by the stator windings and the rotor bars couple and create a torque which causes the rotor to rotate. The stator and rotor operate as a rotating transformer with a secondary (rotor) whose secondary impedance is determined by the cross-sectional area of the rotor bars. The magnitude of the current in the stator windings is affected by the rotor impedance.

In the above described induction motor, the rotor rotates at a speed less than synchronous speed when the load torque is greater than zero. For example, in a six pole induction motor, the synchronous speed (for sixty hertz operation) is 1200 rpm. The rotor may, however, have an actual steady state speed of 1100 rpm. Such a condition is known as "slip." Factors affecting steady state slip of the rotor include the stator voltage (current), bearing friction, and rotor unbalance. For X-ray tube applications, during transients such as anode acceleration and braking, the stator voltage (current) and frequency profile together with the anode assembly rotational moment of inertia and rotor temperatures have the greatest influence on the rotor slip.

In an X-ray tube system, the rotational speed of the anode preferably is precisely controlled so that an operator can prevent the anode from overheating. If the anode overheats, a scan may have to be interrupted to allow the anode to cool. Interrupting a scan, of course, is highly undesirable. Overheating of the anode can also result in degradation of image quality.

In addition, it is also highly desirable for the motor performance to be optimized so that the anode reaches its peak speed at a minimum possible time, thus enabling operation of the X-ray tube system at full power as quickly as possible with a high patient turn-over rate.

Variations in motor performance can result from variation in operating conditions (e.g., temperature, load torque), and variations in motor dimensions (e.g., due to variation in labor, machining tools). Variations in operating conditions are sometimes referred to as noise parameters. Variations in motor dimensions are sometimes referred to as manufacturing tolerances.

Williamson et al., "Optimization of the Geometry of Closed Rotor Slots for Cage Induction Motors," IEEE TRANSACTIONS ON INDUSTRY APPLICATIONS, Vol. 32, No. 3, May/June 1996, pp. 560–568, describes an optimization procedure to determine the design of a rotor bar slot to obtain maximum operating efficiency but does not appear to address manufacturing tolerances.

Moses et al., "A Computer-Based Design Assistant for Induction Motors," IEEE TRANSACTIONS ON INDUSTRY APPLICATIONS, Vol. 30, No. 6, November/December 1994, describes a computer-based design assistant for motor cost optimization using Monte-Carlo analysis but again does not appear to address manufacturing tolerances or capabilities.

Tucci et al., "A Simulator of the Manufacturing of Induction Motors," IEEE TRANSACTIONS ON INDUSTRY APPLICATIONS, Vol. 30, No. 3, May/June 1994, describes a simulator of the manufacturing process of induction motors which includes providing feedback in the form of motor cost and production scheduling. The description of the process appears to relate more to optimizing the factory itself rather than optimizing the design of a motor.

BRIEF SUMMARY OF THE INVENTION

It is further desirable to provide a motor design method for a robust motor that has no or limited variation in its performance from one motor to another due to manufacturing variations. A robust drive system provides minimal sensitivity to operating conditions variations while a robust motor has minimal sensitivity to manufacturing tolerances. It is desirable to have a motor that is not only optimal and robust but that additionally is manufacturable with existing technology at a low cost and with maximum ease.

Briefly, in one embodiment of the present invention, an optimization method for design of an electric machine includes identifying at least one critical-to-quality function of the machine; identifying key parameters of the machine;

and using the key parameters to optimize an objective function that maximizes a mean value of the critical-to-quality function and minimizes a standard deviation of the critical-to-quality function so as to optimize performance of the machine and provide minimal performance sensitivity of the machine with respect to dimension variations due to manufacturing variability of the machine.

Optimal performance is attained by maximizing (optimizing) the CTQ value. Robustness is attained by minimizing (optimizing) sensitivity of the CTQ value to variations in noise parameters. While performing the optimization, constraints can be provided to ensure ease of manufacturing.

DETAILED DESCRIPTION OF THE INVENTION

Figure 1:
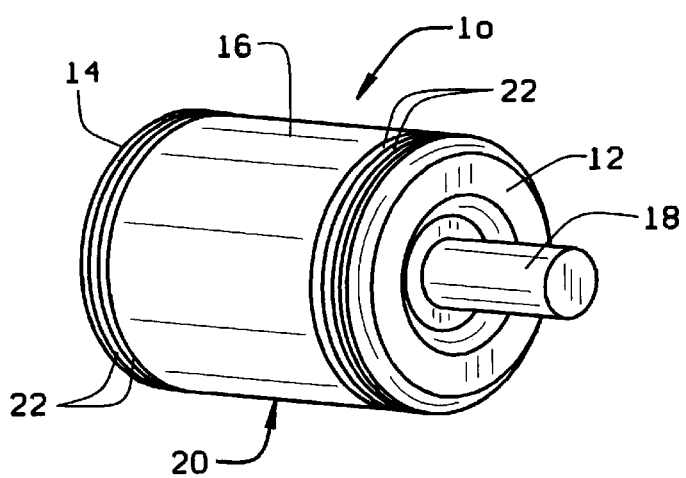
FIG. 1 is a perspective view of the motor rotor.

A perspective view of rotor 10 is shown in FIG. 1. First and second end rings 12 and 14 are at opposite ends of rotor 10, and end rings 12 and 14 short respective first and second ends of rotor bars 16. Rotor shaft 18 extends through rotor core 20 formed by a plurality of laminations 22. For an x-ray source, rotor shaft 18 is coupled to an anode shaft of the x-ray source (not shown).

Figure 2:
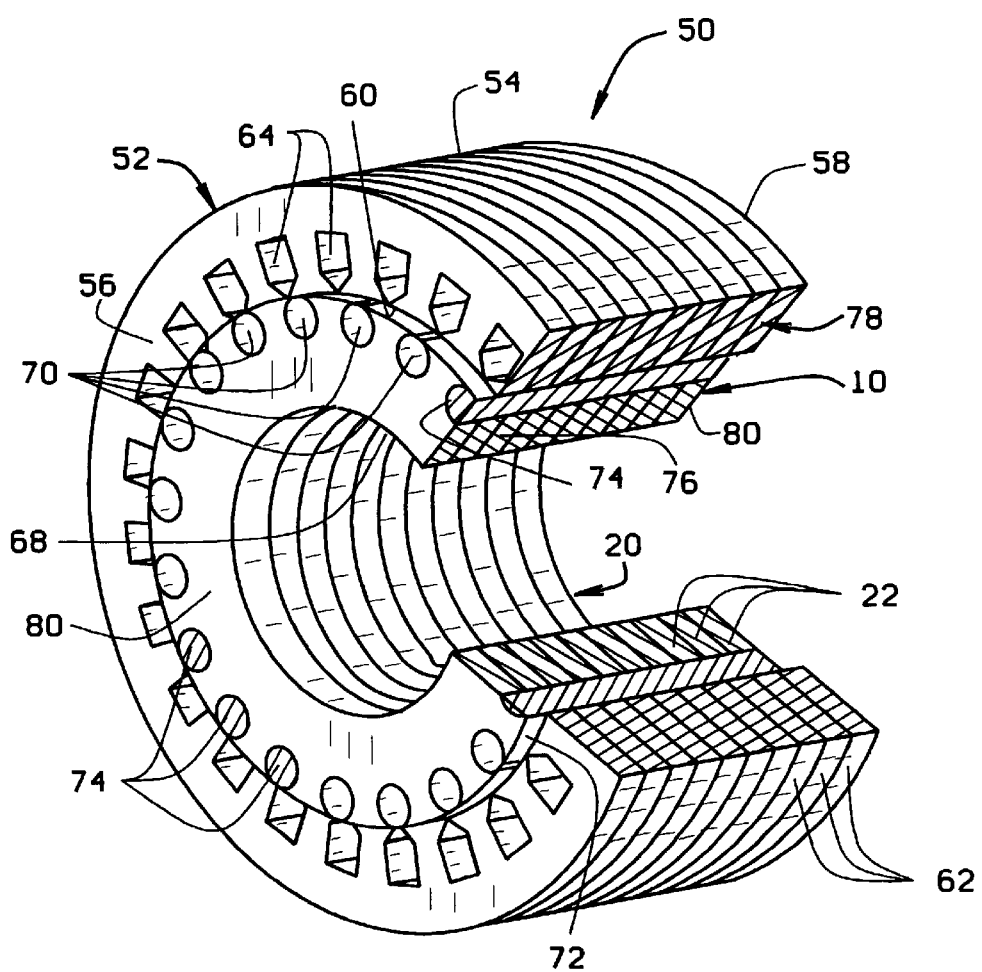
FIG. 2 is a partial perspective cross-section view of a stator and a rotor in accordance with one embodiment of the present invention.

FIG. 2 illustrates a partial perspective cross-section view of an electric machine 50 (which may comprise either a motor or a generator, for example) including rotor 10 and a stator 52. Stator 52 has a stator core 54 and stator windings (not shown). Stator core 54 has a first end 56, a second end 58, and a substantially cylindrical stator bore 60 extending from stator first end 56 to stator second end 58. Stator core 54 is formed by a plurality of identical stator laminations 62. Each stator lamination 62 includes a plurality of stator winding slots 64 at a periphery 66 of stator bore 60. Stator windings (not shown) are injected into stator winding slots 64, and the stator windings form a selected number of poles, e.g., two poles, four poles, or six poles.

Rotor 10, as shown, is substantially cylindrical and is mounted within stator bore 60, e.g., using a cantilever structure or bearings mounted in endshields, as is well known, so that rotor 10 is coaxial with stator bore 60. Particularly, rotor 10 is mounted rotatably within stator bore 60 so that rotor 10 rotates relative to stator 52. Rotor 10, alternatively, may be mounted within stator bore 60 so that stator 52 rotates relative to rotor 10.

As explained above, rotor core 20 of rotor 10 is formed by a plurality of identical rotor laminations 22. Rotor core 20, alternatively, can be formed from a one-piece steel stock. Rotor shaft bore 68 is configured to coaxially receive therein rotor shaft (shown in FIG. 1). Rotor core 20 further includes a plurality of rotor bar slots 70 at an outer periphery 72 of rotor core 20. As shown, a plurality of rotor bars 74 are located, i.e., cast, within respective rotor bar slots 70. Each rotor bar 74 has a first end 76 and a second end 78, and extends from rotor first end 80 to rotor second end 82.

In operation, a voltage at a known frequency is impressed on the stator windings to energize the stator windings and generate a stator current, $I_{STATOR}$, in the stator windings. Stator current, $I_{STATOR}$, generates a magnetic field in the stator windings, which field induces a rotor current, $I_{ROTOR}$, in rotor bars 74. As a result of the induced rotor current, $I_{ROTOR}$, in rotor bars 74, magnetic fields are generated, and the rotor bar magnetic fields couple with the stator magnetic fields to create a torque. Rotor 10 begins to rotate when the respective magnetic fields couple.

However, as described above, rotor 10 does not rotate at a synchronous speed. Rather, rotor 10 rotates at a speed less than synchronous speed. The difference between synchronous speed and actual rotor shaft rotation speed is referred to herein as slip frequency.

Figure 3:
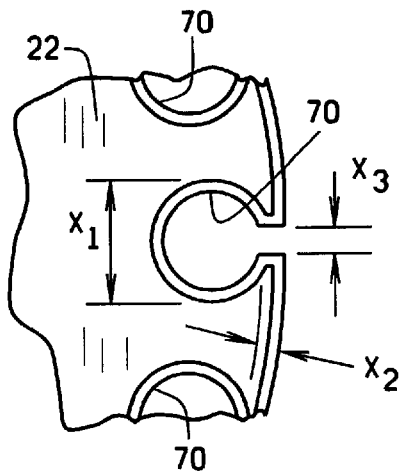
FIG. 3 is an end view of a portion of one of the rotor laminations of the rotor shown in FIGS. 1 and 2.

FIG. 3 is an end view of a portion of one of rotor laminations 22, and illustrates details of a rotor bar slot 70. Parameters of slot 70 are defined as a rotor bar slot width $x_1$, a distance from rotor core periphery to a tangential line to a slot circular portion $x_2$, and a diameter of said slot circular portion $X_3$. Constraints on the permissible ranges of changing $x_1$, $X_2$, and $x_3$ depend on the particular application.

Set forth below is a description of a method for optimizing the parameters of rotor bar slot 70 as defined above. The optimization method is not limited to practice with selecting rotor bar slot dimensions, and can be used in many other contexts. Therefore, although the following description is related to selecting rotor bar slot dimensions, the optimization method is not limited to such context.

Figure 4:
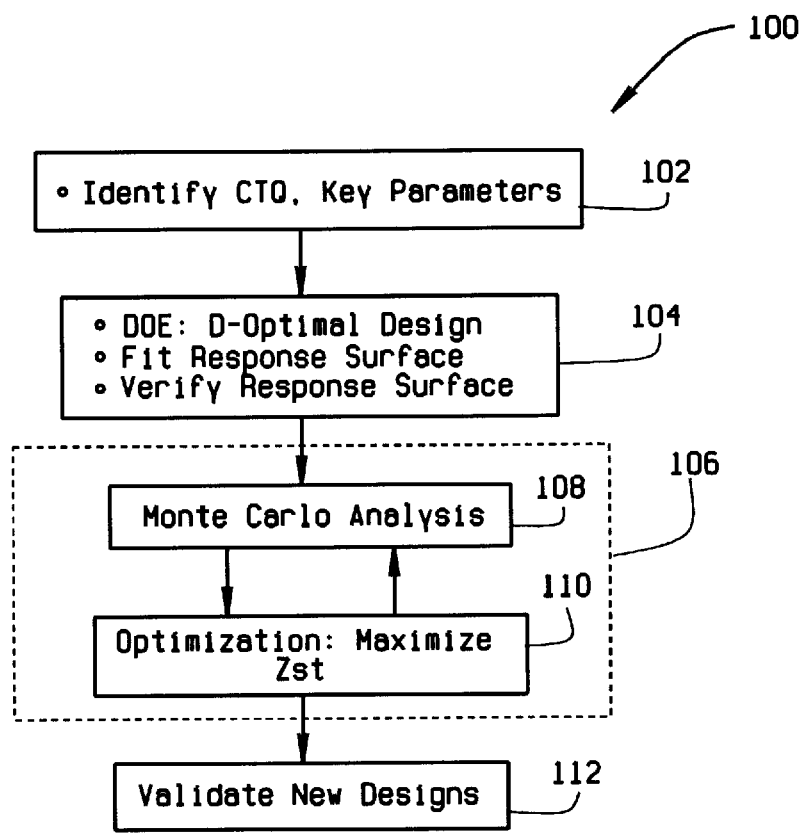
FIG. 4 is a flow chart illustrating process steps for an optimization process.

More specifically, FIG. 4 is a flow chart illustrating process steps in an optimization process 100. For process 100, a Critical-To-Quality function is specified, parameters that can be changed to reached optimal solution (sometimes referred to as key parameters) are identified, and the problem constraints, which are derived from physical, practical, or manufacturability limits, also are identified 102.

With respect to induction motor 50, performance of induction motor 50 is typically characterized by pull-out torque, rated torque per ampere, and slip. For this exemplary embodiment, an optimal induction motor performance can be obtained if pull-out torque and rated torque per ampere are maximized while minimizing slip. Consequently, a composite objective function (CTQ) for motor can be established as:

$$CTQ = 1 + \left[\left.\frac{T_e}{I}\right|_{s=0.2} + 2 \cdot \left.\frac{T_e}{I}\right|_{s=s_{\max}} - |B_{st} - B_{rt}| - s_{\max}\right] \quad (1)$$

where $T_e$=Torque, I=current, s=slip, $B_{st}$=stator tooth flux density, $B_{rt}$=rotor tooth flux density, and $s_{max}$=slip at maximum torque. By maximizing the above function, peak torque per ampere and rated torque per ampere are maximized at minimal slip while keeping the difference between the stator and rotor teeth flux densities to a minimum to fully utilize the machine iron.

In the exemplary embodiment, the changeable parameters are the dimensions $x_1$, $x_2$, and $x_3$ (FIG. 3). Constraints on the permissible ranges of changing $x_1$, $x_2$, and $X_3$ depend on the particular application. The following constraints can be applied for an induction motor utilized to drive the anode of a specific X-ray tube, and are exemplary only. The exemplary manufacturing and sizing constraints (dimensions are in mm) are:

$$3 \le x_1 \le 9, 0 \le x_2 \le 5, 0 \le x_3 \le 9, x_3 \le x_1, \frac{x_1}{2} + x_2 + \sqrt{\frac{x_1^2}{4} - \frac{x_3^2}{4}} \le 9 \quad (2)$$

Other constraints may also apply. For example, the constraint $x_1 = x_3$ can be used to facilitate manufacturability. Again, the constraints identified above are exemplary only, and the specific constraints depend on the particular application.

The combination of maximizing performance as measured by equation (1) and reducing variability dictates an objective function that maximizes the mean value of the CTQ while minimizing its standard deviation (or variance) attributed to manufacturing tolerances (and generally to any noise parameter). Therefore, the objective function can be (in this exemplary embodiment) a ratio of mean and standard deviation of the CTQ (as defined in Equation 1). This quantity is referred to as $Z_{st}$. An exemplary objective function is:

$$\max Zst = \frac{\text{mean} - A}{\text{standard deviation}} \quad (3)$$

subject to: $3 \le x_{1,avg} \le 9, 0 \le x_{2,avg} \le 5, 0 \le x_{3,avg} \le 9$ $$x_{3,avg} = x_{1,avg}, \frac{x_{1,avg}}{2} + x_{2,avg} + \sqrt{\frac{x_{1,avg}^2}{4} - \frac{x_{3,avg}^2}{4}} \le 9$$

where the "avg" subscript stands for the average value of the parameter. In one embodiment, the value of constant A is selected to be about 1.1. Another useful manufacturing constraint is to specify that $x_{3,avg}$ be substantially equal to $x_{1,avg}$.

The functional relationship between the CTQ and $x_1$, $x_2$, and $x_3$ is obtained via a computer model of the electromagnetic field. However, because of the intense computations involved, it is sometimes useful to replace the high-fidelity computer model with a lower fidelity function, response surface 104, obtained using response surface methodology. Response surface methodology includes: (1) design of experiment, i.e., sampling points in the design space of $x_1$, $x_2$, and $x_3$, (2) obtaining CTQ value at these points utilizing the high-fidelity function, and (3) using regression to fit a low-fidelity function, response surface 104. A D-optimal design generates a minimal set of points (design of experiment) while satisfying the constraints in equation (2). The resulting response surface 104 transfer function is a polynomial that includes fourth order terms, so as to accurately represent the plateaus normally encountered in the motor performance as a function of geometrical parameters.

To perform optimization task 110 described in equation (3), an Excel™-based Solver is utilized (Excel is a trademark of Microsoft Corporation). It should be noted that any similar optimization package can be used. Optimization packages search for the optimal solution by iterating successively on the values of the independent variables, $x_1$, $x_2$, and $x_3$ in this case, until reaching an optimal solution while satisfying all of the constraints described in equation (3). Response surface 104 obtained via the response surface methodology relates the deterministic value of the CTQ to the deterministic values of $x_1$, $x_2$, and $x_3$. Nevertheless, all the parameters involved in equation (3) are probabilistic. Therefore, use of a Monte-Carlo method 108 is suggested as part of the overall process 106 to account for variability. At each optimization iteration, Monte-Carlo method 108 is applied to generate many random values of $x_1$, $x_2$, and $x_3$ according to their measured probability density function.

For each generated random set of values $x_1$, $x_2$, and $x_3$, response surface 104 is used to compute the value of CTQ. Generating many random sets of values $x_1$, $x_2$, and $x_3$ (as prescribed by the Monte-Carlo method) enables computing the CTQ's mean and standard deviation which is used to compute the value of $Z_{st}$ (equation 3) at the current optimization iteration. The optimization package (the Excel™-based Solver in this exemplary case) iterates again until the maximum possible value of $Z_{st}$ is attained while satisfying all the constraints in equation (3). The corresponding values of $x_1$, $x_2$, and $x_3$ are then validated 112 either experimentally or analytically using the high-fidelity electromagnetic field simulator.

While the invention has been described in terms of various specific embodiments, those skilled in the art will recognize that the invention can be practiced with modification within the spirit and scope of the claims.

What is claimed is:

1. An optimization method for design of an electric machine comprising:

identifying at least one critical-to-quality function of the machine;

identifying key parameters of the machine;

using the key parameters to optimize an objective function that maximizes a mean value of the critical-to-quality function and minimizes a standard deviation of the critical-to-quality function thereby optimizing performance of the machine and minimizing performance sensitivity of the machine with respect to dimension variations due to manufacturing variability of the machine.

2. A method in accordance with claim 1 wherein the electric machine comprises an X-ray tube induction motor.

3. A method in accordance with claim 1 wherein identifying key parameters comprises identifying constraints on the key parameters.

4. A method in accordance with claim 1 wherein optimizing an objective function comprises the step of fitting an equation to a response surface.

5. A method in accordance with claim 1 wherein optimizing an objective function comprises performing a Monte-Carlo analysis.

6. An optimization method for design of a rotor bar slot for a rotor comprising:

identifying at least one critical-to-quality function of the rotor;

identifying key parameters of the rotor;

selecting rotor bar slot dimensions by using the key parameters to optimize an objective function that maximizes a mean value of the critical-to-quality function and minimizes a standard deviation of the critical-to-quality function thereby optimizing performance of the machine and minimizing performance sensitivity of the rotor with respect to dimension variations due to manufacturing variability of the machine.

7. A method in accordance with claim 6 wherein the rotor comprises an X-ray tube rotor.

8. An electric machine, comprising:

a stator having a stator bore extending therethrough; and a rotor comprising a substantially cylindrical core located within said stator bore, a plurality of rotor bar slots extending through said core, a plurality of rotor bars, each said rotor bars extending through a respective one of said rotor bar slots, said stator and rotor dimensions selected by using the key parameters to optimize an objective function that maximizes a mean value of a critical-to-quality function and minimizes a standard deviation of a critical-to-quality function thereby optimizing performance of the machine and minimizing performance sensitivity with respect to dimension variations due to manufacturing variability of the machine.

9. A machine in accordance with claim 8 wherein the machine comprises an X-ray tube motor.

10. A rotor comprising a substantially cylindrical core, a plurality of rotor bar slots extending through said core; and a plurality of rotor bars, each said rotor bar extending through a respective one of said rotor bar slots extending through said core, said rotor bar slots having dimensions selected by using the key parameters to optimize an objective function that maximizes a mean value of a critical-to-quality function and minimizes a standard deviation of a critical-to-quality function thereby optimizing performance of the rotor and minimizing performance sensitivity with respect to dimension variations due to manufacturing variability of the rotor.

* * * * *